(12) United States Patent
Tanaka et al.

(10) Patent No.: US 7,829,648 B2
(45) Date of Patent: Nov. 9, 2010

(54) SILICONE GEL COMPOSITION

(75) Inventors: Miyuki Tanaka, Annaka (JP);
Kazuyasu Sato, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 770 days.

(21) Appl. No.: 11/123,193

(22) Filed: May 6, 2005

(65) Prior Publication Data
US 2005/0250903 A1 Nov. 10, 2005

(30) Foreign Application Priority Data
May 7, 2004 (JP) .............................. 2004-138451

(51) Int. Cl.
*C08G 77/00* (2006.01)
*C08G 77/04* (2006.01)
(52) U.S. Cl. .......................................... 528/15; 528/31
(58) Field of Classification Search ................... 528/15, 528/31
See application file for complete search history.

(56) References Cited

U.S. PATENT DOCUMENTS

| | | | | |
|---|---|---|---|---|
| 3,020,260 | A * | 2/1962 | Nelson ......................... | 528/15 |
| 4,100,627 | A * | 7/1978 | Brill, III ........................ | 623/8 |
| 4,455,691 | A * | 6/1984 | Van Aken Redinger et al. . | 623/8 |
| 4,720,431 | A * | 1/1988 | Wong .......................... | 428/447 |
| 4,720,521 | A * | 1/1988 | Spielvogel et al. ........... | 524/862 |
| 4,831,080 | A * | 5/1989 | Blizzard et al. .............. | 525/100 |
| 4,861,804 | A * | 8/1989 | Nakanishi ..................... | 521/54 |
| 5,015,691 | A * | 5/1991 | Lewis et al. ................... | 525/100 |
| 5,025,073 | A * | 6/1991 | Lewis et al. ................... | 528/15 |
| 5,079,300 | A * | 1/1992 | Dubrow et al. .............. | 525/106 |
| 5,092,922 | A * | 3/1992 | Kuwata et al. ................. | 106/3 |
| 5,096,990 | A * | 3/1992 | Takayanagi et al. ........... | 528/15 |
| 5,132,385 | A * | 7/1992 | Sumpter et al. ............... | 528/15 |
| 5,132,442 | A * | 7/1992 | Sumpter et al. .............. | 556/136 |
| 5,142,035 | A * | 8/1992 | Lewis .......................... | 536/103 |
| 5,190,827 | A * | 3/1993 | Lin ............................. | 428/447 |
| 5,206,329 | A * | 4/1993 | Sumpter et al. ............... | 528/15 |
| 5,215,635 | A * | 6/1993 | Stein et al. ............. | 204/157.62 |
| 5,239,035 | A * | 8/1993 | Maxson ........................ | 528/15 |
| 5,281,656 | A * | 1/1994 | Thayer et al. ................ | 524/601 |
| 5,412,004 | A * | 5/1995 | Tachibana et al. ............. | 524/27 |
| 5,432,280 | A * | 7/1995 | Hara et al. ................... | 524/730 |
| 5,530,060 | A * | 6/1996 | Fujiki et al. ................. | 524/786 |
| 5,548,038 | A * | 8/1996 | Enami et al. ................. | 525/478 |
| 5,770,298 | A * | 6/1998 | Nakamura et al. ........ | 428/195.1 |
| 6,111,221 | A * | 8/2000 | Miyakoshi et al. ........... | 219/216 |
| 6,552,096 | B2 * | 4/2003 | Meguriya ..................... | 521/54 |
| 6,645,638 | B2 * | 11/2003 | Fujiki et al. ................. | 428/447 |
| 6,780,518 | B2 * | 8/2004 | Azechi et al. ................ | 428/451 |
| 6,887,932 | B2 * | 5/2005 | Azechi ......................... | 524/492 |
| 6,967,221 | B2 * | 11/2005 | Meguriya ..................... | 521/54 |
| 7,119,143 | B2 * | 10/2006 | Jarnjevic et al. ............. | 524/588 |
| 7,128,977 | B2 * | 10/2006 | Yamamoto et al. ........... | 428/447 |
| 2001/0016609 | A1 * | 8/2001 | Meguriya et al. ............. | 521/54 |
| 2001/0039323 | A1 * | 11/2001 | Achenbach et al. ........... | 528/15 |
| 2002/0014712 | A1 * | 2/2002 | Meguriya ..................... | 264/49 |
| 2002/0028335 | A1 * | 3/2002 | Fujiki et al. ................. | 428/447 |
| 2002/0032270 | A1 * | 3/2002 | Azechi ......................... | 524/492 |
| 2002/0082377 | A1 * | 6/2002 | Bohin et al. .................. | 528/15 |
| 2002/0132891 | A1 * | 9/2002 | Azechi et al. ............... | 524/261 |
| 2002/0150768 | A1 * | 10/2002 | Lewis et al. ................. | 428/447 |
| 2003/0045615 | A1 * | 3/2003 | Nakamura et al. .......... | 524/261 |
| 2003/0105262 | A1 * | 6/2003 | Mueller et al. ................ | 528/15 |
| 2005/0038183 | A1 * | 2/2005 | Ahn et al. .................... | 524/861 |
| 2005/0038217 | A1 * | 2/2005 | Ahn et al. ..................... | 528/15 |

FOREIGN PATENT DOCUMENTS

| | | |
|---|---|---|
| EP | 0 732 373 A1 | 9/1996 |
| EP | 1 424 364 A1 | 6/2004 |
| EP | 1 437 382 A1 | 7/2004 |
| JP | 5-105814 | 4/1993 |
| JP | 6-234922 | 8/1994 |
| JP | 9-138606 | 5/1997 |
| JP | 2000-169714 | 6/2000 |
| JP | 2000-198930 | 7/2000 |
| JP | 2001-081324 | 3/2001 |
| JP | 2003-192909 | 7/2003 |
| JP | 2004-101851 | 4/2004 |
| JP | 2004-231824 | 8/2004 |

OTHER PUBLICATIONS

Bruce B. Hardman and Arnold Torkelson "Silicon Compounds (Silicones)", Encyclopedia of Chemical Technology, vol. 20, $3^{rd}$ edition, John Wiley & Sons, Inc. 1982, pp. 936-937.*

(Continued)

*Primary Examiner*—Randy Gulakowski
*Assistant Examiner*—Robert Loewe
(74) *Attorney, Agent, or Firm*—Oblon, Spivak, McClelland, Maier & Neustadt, L.L.P.

(57) ABSTRACT

Provided is a silicone gel composition including (A) an organopolysiloxane containing at least one alkenyl group bonded to a silicon atom within each molecule, represented by an average composition formula: $R_a R^1{}_b SiO_{(4-a-b)/2}$ (wherein, each R group represents, independently, an alkenyl group, each $R^1$ group represents, independently, an unsubstituted or substituted monovalent hydrocarbon group that contains no aliphatic unsaturated bonds, a represents a positive number from 0.0001 to 0.2, b represents a positive number from 1.7 to 2.2, and a+b represents a number within a range from 1.9 to 2.4), (B) an organohydrogenpolysiloxane containing at least two hydrogen atoms bonded to silicon atoms within each molecule, and (C) a platinum-based catalyst. Also provided is the silicone gel composition stated above, in which a penetration value of a cured product of this composition, as defined in JIS K2220, is within a range from 20 to 200. The silicone gel composition generates a silicone gel cured product which displays a low elastic modulus and low stress, and suffers no oil bleeding over time.

10 Claims, No Drawings

OTHER PUBLICATIONS

Gelest Technical Catalog "Reactive Silicones: Forging New Polymer Links" 64 pages, 2004.*

U.S. Appl. No. 12/233,781, filed Sep. 19, 2008, Tanaka et al.

* cited by examiner

SILICONE GEL COMPOSITION

BACKGROUND OF THE INVENTION

1. Field of the Invention

The present invention relates to a silicone gel composition which generates a silicone gel cured product that suffers no oil bleeding over time.

2. Description of the Prior Art

Silicone gel compositions are addition reaction curable organopolysiloxane compositions comprising an organohydrogenpolysiloxane containing hydrogen atoms bonded to silicon atoms (namely, SiH groups), an organopolysiloxane containing alkenyl groups such as vinyl groups bonded to silicon atoms, and a platinum-based catalyst, and these compositions generate a cured product via an addition reaction of the silicon atom-bonded hydrogen atoms to the alkenyl groups. Silicone gel cured products produced by heating and curing silicone gel compositions display excellent levels of heat resistance, weather resistance, oil resistance, cold resistance, and electrical insulation, and also display low elastic modulus values and low levels of stress, and as a result, they are widely used in the protection of electronic components such as vehicle-mounted electronic components and household electronic appliance components. The low elastic modulus and low stress level that represent characteristic features of a silicon gel cured product are not found in other elastomer products, but these features are realized by reducing the quantity of the organohydrogenpolysiloxane within the composition, or blending an unreactive non-functional organopolysiloxane oil into the composition, thereby reducing the cross-linking density within the cured product. As a result, the silicon gel cured product contains free oils such as unreacted organopolysiloxane and non-cross-linked oil components. If a silicone gel cured product containing this type of free oil is used for protecting an electronic component, then over time the free oil within the silicone gel cured product tends to bleed out, and depending on the material and design of the electronic component casing, this free oil can leak out through fine gaps. In recent years, instances of such leakage causing contamination of electronic components such as substrates, circuits, wiring, and terminals have been steadily increasing.

A number of methods have been proposed for reducing this type of oil bleeding, including (1) a method of reducing the free oil content by increasing the cross-linking density, (2) a method in which a filler is mixed into the composition, and (3) a method of slowing the movement of the free oil component within the cured product by mixing in an extremely high molecular weight oil to inhibit movement. However, the method (1) risks losing the characteristic low stress property of the silicone gel cured product, and the methods (2) and (3), although reducing the speed with which the free oil bleeds out, do not provide a fundamental resolution of the problem.

Accordingly, the development of a silicone gel composition capable of generating a silicone gel cured product that retains the above characteristic features of silicone gel cured products, while suffering no oil bleeding over time, has been keenly sought.

SUMMARY OF THE INVENTION

The present invention takes the above circumstances into consideration, with an object of providing a silicone gel composition that generates a silicone gel cured product which displays a low elastic modulus and low stress, and also suffers no oil bleeding over time.

As a result of intensive investigations, the inventors of the present invention discovered that a silicone gel composition described below was able to achieve the object described above.

In other words, the present invention provides a silicone gel composition comprising:
(A) 100 parts by mass of an organopolysiloxane containing at least one alkenyl group bonded to a silicon atom within each molecule, represented by an average composition formula (1) shown below:

$$R_a R^1_b SiO_{(4-a-b)/2} \quad (1)$$

(wherein, each R group represents, independently, an alkenyl group, each $R^1$ group represents, independently, an unsubstituted or substituted monovalent hydrocarbon group that contains no aliphatic unsaturated bonds, a represents a positive number from 0.0001 to 0.2, b represents a positive number from 1.7 to 2.2, and a+b represents a number within a range from 1.9 to 2.4),
(B) an organohydrogenpolysiloxane containing at least two hydrogen atoms bonded to silicon atoms within each molecule, in a quantity of at least 15 parts by mass, and in sufficient quantity to provide from 0.3 to 2.5 hydrogen atoms bonded to silicon atoms within this component for every one alkenyl group bonded to a silicon atom within the component (A), and
(C) an effective quantity of a platinum-based catalyst.

The present invention also provides the silicone gel composition stated above, wherein a penetration value of a cured product of said composition, as defined in JIS K2220, is within a range from 20 to 200.

The present invention further provides a cured product produced by curing a composition stated above, wherein a penetration value of said cured product, as defined in JIS K2220, is within a range from 20 to 200.

A silicone gel composition of the present invention generates a silicone gel cured product that retains the characteristic features (a low elastic modulus and low stress) of a silicone gel while suffering no oil bleeding over time. Accordingly, there is no danger of contamination, even when used with electronic components or the like.

DETAILED DESCRIPTION OF THE PREFERRED EMBODIMENTS

A silicone gel composition of the present invention comprises the following components (A) through (C) as essential components. In the present invention, the term "silicone gel cured product" refers to a cured product with a low cross-linking density, comprising an organopolysiloxane as the primary component, and with a penetration value according to JIS K2220 (¼ cone) within a range from 20 to 200. This corresponds to a product which, in a rubber hardness measurement according to JIS K6301, returns a value (a rubber hardness value) of zero, being of such low hardness (namely, so soft) as to have effectively no rubber hardness value. In this respect, the silicone gel cured product is quite different from a so-called silicone rubber cured product (a rubber-like elastomer).

As follows is a detailed description of each of the components. In the present invention, viscosity values refer to values measured at 25° C.

[(A) Organopolysiloxane]

The component (A) of the present invention is the primary component (the base polymer) of the silicone gel composition. This component (A) is an organopolysiloxane containing at least one alkenyl group bonded to a silicon atom (in this description, also described as a silicon atom-bonded alkenyl group) within each molecule, as represented by the above average composition formula (1).

In the above formula (1), each R group represents, independently, an alkenyl group, typically of 2 to 6, and preferably 2 to 4, and even more preferably 2 to 3, carbon atoms. Specific examples of the alkenyl group include a vinyl group, allyl group, propenyl group, isopropenyl group, butenyl group, and isobutenyl group, although a vinyl group is particularly preferred. Each $R^1$ group represents, independently, an unsubstituted or substituted monovalent hydrocarbon group that contains no aliphatic unsaturated bonds, and this group typically contains from 1 to 10, and preferably from 1 to 6, carbon atoms. Specific examples of such groups include alkyl groups such as methyl groups, ethyl groups, propyl groups, isopropyl groups, butyl groups, isobutyl groups, tert-butyl groups, pentyl groups, hexyl groups, cyclohexyl groups, octyl groups, and decyl groups; aryl groups such as phenyl groups and tolyl groups; aralkyl groups such as benzyl groups and phenylethyl groups; and groups in which a portion, or all, of the hydrogen atoms within these groups have been substituted with a halogen atom such as a chlorine, bromine, or fluorine atom, including chloromethyl groups and 3,3,3-trifluoropropyl groups. Of these, methyl groups, phenyl groups, and 3,3,3-trifluoropropyl groups are particularly preferred in terms of ease of synthesis.

Furthermore, a must be a positive number within a range from 0.0001 to 0.2, and is preferably a positive number from 0.0005 to 0.1. b must be a positive number within a range from 1.7 to 2.2, and is preferably a positive number from 1.9 to 2.02. Moreover, a+b must satisfy a number within a range from 1.9 to 2.4, and is preferably within a range from 1.95 to 2.05.

This component must contain at least one silicon atom-bonded alkenyl group within each molecule, and preferably contains from 2 to 50, and even more preferably from 2 to 10 of such groups. The values for the aforementioned a and b should be selected in order to meet this silicon atom-bonded alkenyl group requirement.

There are no particular restrictions on the molecular structure of the organopolysiloxane of this component, and either a straight chain structure, or a branched structure comprising $RSiO_{3/2}$ units, $R^1SiO_{3/2}$ units and $SiO_2$ units and the like is suitable, although organopolysiloxanes represented by a general formula (1a) shown below:

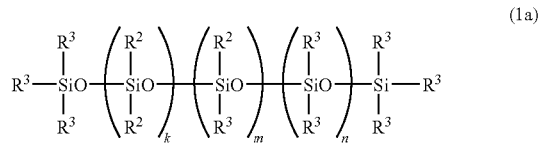

(1a)

(wherein, each $R^2$ group represents, independently, an unsubstituted or substituted monovalent hydrocarbon group that contains no aliphatic unsaturated bonds, each $R^3$ group represents, independently, either an unsubstituted or substituted monovalent hydrocarbon group that contains no aliphatic unsaturated bonds, or an alkenyl group, although at least one of the $R^3$ groups must be an alkenyl group, and in those cases where one of the molecular chain terminal $R^3$ groups is an alkenyl group, k represents an integer of 40 to 1,200, m represents an integer of 0 to 50, and n represents an integer of 0 to 50, whereas in those cases where none of the molecular chain terminal $R^3$ groups is an alkenyl group, k represents an integer of 40 to 1,200, m represents an integer of 1 to 50, and n represents an integer of 0 to 50, and m+n is at least 1), that is, straight chain diorganopolysiloxanes in which the principal chain is formed basically from repeating diorganosiloxane units, and both terminals of the molecular chain are blocked with triorganosiloxy groups, are particularly preferred.

In the above formula (1a), the non-alkenyl unsubstituted or substituted monovalent hydrocarbon groups that contain no aliphatic unsaturated bonds represented by $R^2$ typically contain from 1 to 10, and preferably from 1 to 6, carbon atoms. Specific examples of these groups include the same groups as those listed for the group $R^1$, and of these, methyl groups, phenyl groups, and 3,3,3-trifluoropropyl groups are particularly preferred in terms of ease of synthesis.

Furthermore, the unsubstituted or substituted monovalent hydrocarbon groups that contain no aliphatic unsaturated bonds represented by $R^3$ typically contain from 1 to 10, and preferably from 1 to 6, carbon atoms. Specific examples of these groups include the same groups as those listed for the group $R^1$, and of these, methyl groups, phenyl groups, and 3,3,3-trifluoropropyl groups are particularly preferred in terms of ease of synthesis. The alkenyl group represents by $R^3$ is typically of 2 to 6, and preferably 2 to 4, and even more preferably 2 to 3, carbon atoms. Specific examples of this alkenyl group include a vinyl group, allyl group, propenyl group, isopropenyl group, butenyl group, and isobutenyl group, although a vinyl group is particularly preferred.

In the above formula (1a), in those cases where one of the molecular chain terminal $R^3$ groups is an alkenyl group, organopolysiloxanes in which k represents an integer of 100 to 1,000, m represents an integer of 0 to 40, and n represents 0 are preferred, whereas in those cases where none of the molecular chain terminal $R^3$ groups is an alkenyl group, organopolysiloxanes in which k represents an integer of 100 to 1,000, m represents an integer of 2 to 40, and n represents 0 are preferred.

Specific examples of organopolysiloxanes represented by the above formula (1a) include dimethylpolysiloxane with both terminals blocked with dimethylvinylsiloxy groups, copolymers of dimethylsiloxane and methylvinylsiloxane with both terminals blocked with dimethylvinylsiloxy groups, copolymers of dimethylsiloxane and diphenylsiloxane with both terminals blocked with dimethylvinylsiloxy groups, copolymers of dimethylsiloxane, methylvinylsiloxane, and diphenylsiloxane with both terminals blocked with dimethylvinylsiloxy groups, methyltrifluoropropylpolysiloxane with both terminals blocked with dimethylvinylsiloxy groups, copolymers of dimethylsiloxane and methyltrifluoropropylsiloxane with both terminals blocked with dimethylvinylsiloxy groups, copolymers of dimethylsiloxane, methyltrifluoropropylsiloxane, and methylvinylsiloxane with both terminals blocked with dimethylvinylsiloxy groups, copolymers of dimethylsiloxane and vinylmethylsiloxane with both terminals blocked with trimethylsiloxy groups, copolymers of dimethylsiloxane, vinylmethylsiloxane, and diphenylsiloxane with both terminals blocked with trimethylsiloxy groups, copolymers of vinylmethylsiloxane and methyltrifluoropropylsiloxane with both terminals blocked with trimethylsiloxy groups, dimethylpolysiloxane with the terminals blocked with a trimethylsiloxy group and a dimethylvinylsiloxy group, copolymers of dimethylsiloxane and methylvinylsiloxane with the terminals blocked with a trimethylsiloxy group and a dimethylvinylsiloxy group, copolymers of dimethylsiloxane and diphenylsiloxane with the terminals blocked with a trimethylsiloxy group and a dimethylvinylsiloxy group, copolymers of dimethylsiloxane, diphenylsiloxane, and methylvinylsiloxane with the terminals blocked with a trimethylsiloxy group and a dimethylvinylsiloxy group, methyltrifluoropropylpolysiloxane with the terminals blocked with a trimethylsiloxy group and a dimethylvinylsiloxy group, copolymers of dimethylsiloxane and methyltrifluoropropylsiloxane with the terminals blocked with a trimethylsiloxy group and a dimethylvinylsiloxy group, copolymers of dimethylsiloxane, methyltrifluoropropylsiloxane, and methylvinylsiloxane with the terminals blocked with a trimethylsiloxy group and a dimethylvinylsiloxy group, dimethylpolysiloxane with both terminals blocked with methyldivinylsiloxy groups, copolymers of dimethylsiloxane and methylvinylsiloxane with both terminals blocked with methyldivinylsiloxy groups, copolymers of dimethylsiloxane and diphenylsiloxane with both terminals blocked with methyldivinylsiloxy groups, copolymers of dimethylsiloxane, methylvinylsiloxane, and diphenylsiloxane with both terminals blocked with methyldivinylsiloxy groups, methyltrifluoropropylpolysiloxane with both terminals blocked with methyldivinylsiloxy groups, copolymers of dimethylsiloxane and methyltrifluoropropylsiloxane with both terminals blocked with methyldivinylsiloxy groups, copolymers of dimethylsiloxane, methyltrifluoropropylsiloxane, and methylvinylsiloxane with both terminals blocked with methyldivinylsiloxy groups, dimethylpolysiloxane with both terminals blocked with trivinylsiloxy groups, copolymers of dimethylsiloxane and methylvinylsiloxane with both terminals blocked with trivinylsiloxy groups, copolymers of dimethylsiloxane and diphenylsiloxane with both terminals blocked with trivinylsiloxy groups, copolymers of dimethylsiloxane, methylvinylsiloxane, and diphenylsiloxane with both terminals blocked with trivinylsiloxy groups, methyltrifluoropropylpolysiloxane with both terminals blocked with trivinylsiloxy groups, copolymers dimethylsiloxane and methyltrifluoropropylsiloxane with both terminals blocked with trivinylsiloxy groups, and copolymers of dimethylsiloxane, methyltrifluoropropylsiloxane, and methylvinylsiloxane with both terminals blocked with trivinylsiloxy groups.

There are no particular restrictions on the viscosity of the organopolysiloxane of this component, although in terms of ensuring favorable handling and workability properties for the composition, and producing a cured product with good strength and fluidity, the viscosity is preferably within a range from 50 to 100,000 mPa·s, and even more preferably from 100 to 10,000 mPa·s.

[(B) Organohydrogenpolysiloxane]

The component (B) of the present invention reacts with the aforementioned component (A), and functions as a cross-linking agent. This component (B) is an organohydrogenpolysiloxane containing at least two hydrogen atoms bonded to silicon atoms (namely, SiH groups (hydrosilyl groups), in this description also referred to as silicon atom-bonded hydrogen atoms) within each molecule. The number of silicon atom-bonded hydrogen atoms within each molecule of this organohydrogenpolysiloxane is preferably within a range from 2 to 30, even more preferably from 2 to 10, and most preferably from 2 to 5.

The silicon atom-bonded hydrogen atoms contained within the organohydrogenpolysiloxane of this component may be positioned at the molecular chain terminals, at non-terminal positions within the molecular chain, or at both of these positions. Furthermore, there are no particular restrictions on the molecular structure, which may be a straight chain, a cyclic structure, a branched structure, or a three dimensional network (resin) type structure.

The number of silicon atoms within each molecule of the organohydrogenpolysiloxane of this component (that is, the polymerization degree) is typically within a range from 20 to 1,000, although from the viewpoints of ensuring favorable handling and workability properties for the composition, and producing a cured product with favorable properties (low elastic modulus and low stress), the number of silicon atoms is preferably from 40 to 1,000, even more preferably from 40 to 400, even more preferably from 60 to 300, even more preferably from 100 to 300, and most preferably from 160 to 300.

In other words, a composition of the present invention generates a silicone gel cured product with a low elastic modulus and low stress, which suffers no oil bleeding over time, and as described below, in order to achieve these properties and effects, a considerable quantity of at least 15 parts by mass of the organohydrogenpolysiloxane of the component (B), which functions as a cross-linking agent, must be blended with each 100 parts by mass of the component (A), and the number of silicon atom-bonded hydrogen atoms within the component (B) must be set within the specific range from 0.3 to 2.5 for every one silicon atom-bonded alkenyl group within the component (A). In order to satisfy these requirements, the component (B) must selectively employ materials with higher polymerization degree values (that is, a larger number of silicon atoms within each molecule) than the cross-linking agents typically used in conventional addition reaction curable silicone compositions.

Furthermore, the component (B) has a viscosity that typically falls within a range from 10 to 100,000 mPa·s, and preferably from 20 to 10,000 mPa·s, and most preferably from 50 to 5,000 mPa·s, and is ideally a liquid at room temperature (25° C.).

There are no particular restrictions on the organohydrogenpolysiloxane of this component, provided it satisfies the above requirements, although polymers represented by the average composition formula (2) shown below are ideal.

$$R^4_c H_d SiO_{(4-c-d)/2} \quad (2)$$

(wherein, each $R^4$ group represents, independently, an unsubstituted or substituted monovalent hydrocarbon group that contains no aliphatic unsaturated bonds, c represents a positive number from 0.7 to 2.2, d represents a positive number from 0.001 to 0.5, and c+d represents a number within a range from 0.8 to 2.5).

In the above formula (2), each $R^4$ group represents, independently, an unsubstituted or substituted monovalent hydrocarbon group that contains no aliphatic unsaturated bonds, and this group typically contains from 1 to 10, and preferably from 1 to 6, carbon atoms. Specific examples of such groups include alkyl groups such as methyl groups, ethyl groups, propyl groups, isopropyl groups, butyl groups, isobutyl groups, tert-butyl groups, pentyl groups, neopentyl groups, hexyl groups, cyclohexyl groups, octyl groups, nonyl groups, and decyl groups; aryl groups such as phenyl groups, tolyl groups, xylyl groups, and naphthyl groups; aralkyl groups such as benzyl groups, phenylethyl groups, and phenylpropyl groups; and groups in which a portion, or all, of the hydrogen atoms within these groups have been substituted with a halogen atom such as a chlorine, bromine, or fluorine atom, such as 3,3,3-trifluoropropyl groups. Of these, alkyl groups, aryl groups, and 3,3,3-trifluoropropyl groups are preferred, and methyl groups, phenyl groups, and 3,3,3-trifluoropropyl groups are particularly desirable.

Furthermore, c is preferably a positive number from 1.0 to 2.1, whereas d is preferably a positive number from 0.001 to 0.1, even more preferably from 0.005 to 0.1, even more preferably from 0.005 to 0.05, and most preferably from 0.005 to 0.03. Moreover, c+d preferably satisfies a number within a range from 1.0 to 2.5, and is preferably within a range from 1.5 to 2.2.

Specific examples of organohydrogenpolysiloxanes represented by the above formula (2) include cyclic copolymers of methylhydrogensiloxane and dimethylsiloxane, methylhydrogenpolysiloxane with both terminals blocked with trimethylsiloxy groups, copolymers of dimethylsiloxane and methylhydrogensiloxane with both terminals blocked with trimethylsiloxy groups, dimethypolylsiloxane with both terminals blocked with dimethylhydrogensiloxy groups, copolymers of dimethylsiloxane and methylhydrogensiloxane with both terminals blocked with dimethylhydrogensiloxy groups, copolymers of methylhydrogensiloxane and diphenylsiloxane with both terminals blocked with trimethylsiloxy groups, copolymers of methylhydrogensiloxane, diphenylsiloxane, and dimethylsiloxane with both terminals blocked with trimethylsiloxy groups, copolymers of methylhydrogensiloxane, dimethylsiloxane, and diphenylsiloxane with both terminals blocked with dimethylhydrogensiloxy groups, copolymers comprising $(CH_3)_2HSiO_{1/2}$ units, $(CH_3)_3SiO_{1/2}$ units, and $SiO_{4/2}$ units, copolymers comprising $(CH_3)_2HSiO_{1/2}$ units, and $SiO_{4/2}$ units, and copolymers comprising $(CH_3)_2HSiO_{1/2}$ units, $(C_6H_5)_3SiO_{1/2}$ units, and $SiO_{4/2}$ units.

The blend quantity of this component must be at least 15 parts by mass, and is preferably at least 20 parts by mass, per 100 parts by mass of the component (A). The upper limit for the blend quantity is preferably within a range from 15 to 500 parts by mass, and even more preferably from 20 to 500 parts by mass, and most preferably from 30 to 200 parts by mass. In addition to satisfying the above requirement, the blend quantity of this component must also provide from 0.3 and 2.5, and preferably from 0.5 to 2, and most preferably from 0.6 to 1.5, silicon atom-bonded hydrogen atoms for every silicon atom-bonded alkenyl group within the component (A). If this blend quantity is less than 15 parts by mass, then the resulting cured product is prone to oil bleeding. If the aforementioned number of silicon atom-bonded hydrogen atoms is less than 0.3, then the cross-linking density becomes too low, meaning the composition may not cure, or even if cured, may generate a cured product with poor heat resistance, whereas if the number exceeds 2.5, then foaming caused by a dehydrogenation reaction can become problematic, and the resulting cured product may also suffer from poor heat resistance or oil bleeding.

[(C) Platinum-Based Catalyst]

The component (C) of the present invention is used as a catalyst for accelerating the addition reaction between the silicon atom-bonded alkenyl groups within the component (A) and the silicon atom-bonded hydrogen atoms groups within the component (B). The component (C) is a platinum-based catalyst (either platinum or a platinum-based compound), and can employ conventional materials. Specific examples of the catalyst include platinum black, chloroplatinic acid, alcohol modified products of chloroplatinic acid, and complexes of chloroplatinic acid with olefin, aldehydes, vinylsiloxanes or acetylene alcohols.

The blend quantity of this component need only be an effective catalytic quantity, and can be increased or decreased in accordance with the desired curing rate. A typical quantity, calculated as the mass of platinum atoms relative to the combined mass of the component (A) and the component (B), is within a range from 0.1 to 1,000 ppm, with quantities from 1 to 300 ppm being preferred. If this blend quantity is too large, then the heat resistance of the cured product may deteriorate.

[Other Optional Components]

In addition to the components (A) through (C) described above, other optional components may also be added to a composition of the present invention, provided such addition does not impair the objects of the present invention. Examples of such optional components include reaction inhibitors, inorganic fillers, organopolysiloxanes that contain neither silicon atom-bonded hydrogen atoms nor silicon atom-bonded alkenyl groups, heat resistance imparting agents, flame retardancy imparting agents, thixotropic imparting agents, pigments, and dyes.

Reaction inhibitors are used for inhibiting the reaction of the aforementioned composition, and specific examples include acetylene-based, amine-based, carboxylate ester-based, and phosphite ester-based reaction inhibitors.

Examples of inorganic fillers include inorganic fillers such as fumed silica, crystalline silica, precipitated silica, hollow fillers, silsesquioxanes, fumed titanium dioxide, magnesium oxide, zinc oxide, iron oxide, aluminum hydroxide, magnesium carbonate, calcium carbonate, zinc carbonate, layered mica, carbon black, diatomaceous earth, and glass fibers; as well as the above types of fillers that have undergone hydrophobic surface treatment with an organosilicon compound such as an organoalkoxysilane compound, organochlorosilane compound, organosilazane compound, or low molecular weight siloxane compound. Furthermore, silicone rubber powders and silicone resin powders may also be added.

[Composition Curing]

A composition of the present invention can be prepared by mixing the aforementioned components (A) through (C) (together with any optional components, where appropriate) using normal methods. The components to be mixed may be divided into two or more parts for mixing, if required. For example, a part comprising a portion of the component (A) and the component (C) could be mixed with a part comprising the remainder of the component (A) and the component (B).

Subsequently, a silicone gel cured product is produced by curing the composition of the present invention, either at room temperature, or under temperature conditions that best suit the application.

[Penetration Value for Silicone Gel Cured Product]

A cured product produced from a composition of the present invention must have a ¼ cone penetration value, as prescribed in JIS K2220, that falls within a range from 20 to 200, and preferably from 40 to 160, and even more preferably from 50 to 140. If this penetration value is less than 20, then achieving the low elastic modulus and low stress level that represent the characteristic features of a silicone gel cured product can be difficult, whereas if the value exceeds 200, retaining the form of the object as a silicone gel cured product becomes difficult, and the cured product tends to fluidize.

EXAMPLES

As follows is a description of specifics of the present invention, using a series of examples, although the present invention is in no way restricted to these examples. In the examples, "parts" refers to "parts by mass", "%" refers to "% by mass", and "Vi" represents a vinyl group.

Example 1

100 parts of a dimethylpolysiloxane with both terminals blocked with dimethylvinylsiloxy groups and with a viscosity of 1,000 mPa·s, 63 parts of a copolymer of dimethylsiloxane and methylhydrogensiloxane with both terminals blocked with trimethylsiloxy groups and with a viscosity of 1,000 mPa·s, as represented by a formula (3) shown below:

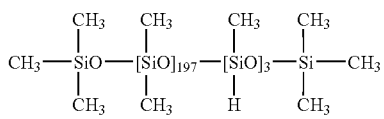
(3)

(the number of silicon atom-bonded hydrogen atoms within the component (B) per silicon atom-bonded alkenyl group within the component (A) (hereafter referred to as H/Vi) was 1.05), and 0.05 parts of a dimethylpolysiloxane solution of a chloroplatinic acid-vinylsiloxane complex containing 1% of platinum atoms were mixed together uniformly, and the resulting composition was cured by heating at 150° C. for 30 minutes, thus yielding a cured product with a penetration value of 70. The penetration value was the ¼ cone penetration value prescribed in JIS K2220 (this also applies below).

Example 2

100 parts of a dimethylpolysiloxane with both terminals blocked with dimethylvinylsiloxy groups and with a viscosity of 5,000 mPa·s, 25 parts of a copolymer of dimethylsiloxane and methylhydrogensiloxane with both terminals blocked with dimethylhydrogensiloxy groups and with a viscosity of 600 mPa·s, as represented by a formula (4) shown below:

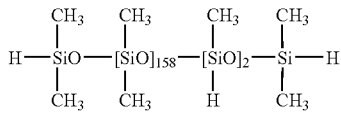
(4)

(H/Vi was 1.3), and 0.05 parts of a dimethylpolysiloxane solution of a chloroplatinic acid-vinylsiloxane complex containing 1% of platinum atoms were mixed together uniformly, and the resulting composition was cured by heating at 150° C. for 30 minutes, thus yielding a cured product with a penetration value of 40.

Example 3

100 parts of a copolymer of dimethylsiloxane and methylvinylsiloxane with both terminals blocked with trimethylsiloxy groups and with a viscosity of 1,000 mPa·s, as represented by a formula (5) shown below:

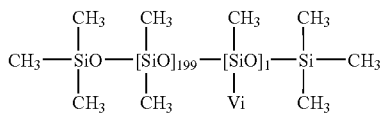
(5)

40 parts of dimethylpolysiloxane with both terminals blocked with dimethylhydrogensiloxy groups and with a viscosity of 600 mPa·s, as represented by a formula (6) shown below:

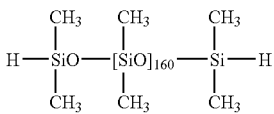
(6)

(H/Vi was 0.95), and 0.05 parts of a dimethylpolysiloxane solution of a chloroplatinic acid-vinylsiloxane complex containing 1% of platinum atoms were mixed together uniformly, and the resulting composition was cured by heating at 150° C. for 30 minutes, thus yielding a cured product with a penetration value of 120.

Comparative Example 1

100 parts of a dimethylpolysiloxane with both terminals blocked with dimethylvinylsiloxy groups and with a viscosity of 1,000 mPa·s, 1.3 parts of a copolymer of dimethylsiloxane and methylhydrogensiloxane with both terminals blocked with dimethylhydrogensiloxy groups, as represented by a formula (7) shown below:

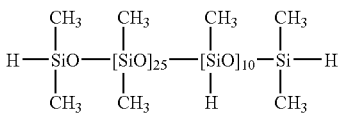
(7)

(H/Vi was 0.5), and 0.05 parts of a dimethylpolysiloxane solution of a chloroplatinic acid-vinylsiloxane complex containing 1% of platinum atoms were mixed together uniformly, and the resulting composition was cured by heating at 150° C. for 30 minutes, thus yielding a cured product with a penetration value of 65.

Comparative Example 2

With the exception of altering the quantity of the copolymer of dimethylsiloxane and methylhydrogensiloxane with both terminals blocked with trimethylsiloxy groups, as represented by the aforementioned formula (3), to 14 parts (H/Vi was 0.2), a composition was prepared in the same manner as the example 1, and an attempt was made to cure this composition by heating at 150° C., but even after heating for a prolonged period, a cured product could not be obtained.

Comparative Example 3

With the exception of replacing the copolymer of dimethylsiloxane and methylhydrogensiloxane with both terminals blocked with trimethylsiloxy groups, as represented by the aforementioned formula (3), with 17 parts of a copolymer of dimethylsiloxane and methylhydrogensiloxane with both terminals blocked with trimethylsiloxy groups, as represented by a formula (8) shown below:

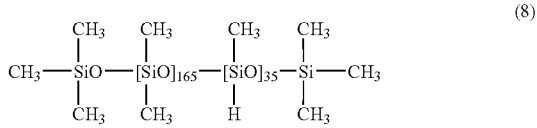

(8)

(H/Vi was 3.0), preparation and curing in the same manner as the example 1 yielded a cured product with a penetration value of 10.

Comparative Example 4

With the exception of altering the quantity of the copolymer of dimethylsiloxane and methylhydrogensiloxane with both terminals blocked with dimethylhydrogensiloxy groups, as represented by the aforementioned formula (7), to 5.0 parts (H/Vi was 2.0), preparation and curing in the same manner as the comparative example 1 yielded a cured product with a penetration value of 10.

Comparative Example 5

With the exception of also adding 5 parts of fumed silica with a specific surface area of 200 m²/g, preparation and curing in the same manner as the comparative example 1 yielded a cured product with a penetration value of 40.

Comparative Example 6

With the exception of replacing the 100 parts of the dimethylpolysiloxane with both terminals blocked with dimethylvinylsiloxy groups and with a viscosity of 1,000 mPa·s with a blend comprising 5 parts of a dimethylpolysiloxane crude rubber with both terminals blocked with dimethylvinylsiloxy groups, as represented by a general formula (9) shown below:

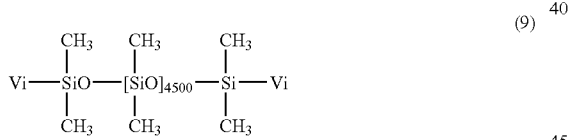

(9)

and 95 parts of the dimethylpolysiloxane with both terminals blocked with dimethylvinylsiloxy groups and with a viscosity of 1,000 mPa·s (W/Vi was 0.5), preparation and curing in the same manner as the comparative example 1 yielded a cured product with a penetration value of 60.

[Oil Bleeding Testing]

Using the 9 different silicone gel compositions prepared in the above examples 1 to 3, and the comparative examples 1 to 6, oil bleeding tests were conducted on ground-glass. 0.2 g of each of the silicone gel compositions was dripped onto a ground-glass sheet that had been preheated to 150° C., and the instantaneously cured silicone gel cured product (with the exception of the composition obtained in the comparative example 2) was left to stand at room temperature (25° C.). Each cured product was inspected 4 times, namely, immediately after dripping (initial), after 1 week, after 2 weeks, and after 4 weeks, and if the ground-glass had discolored due to oil bleeding from the silicone gel cured product, then the diameter of the cured product, including the discolored portion, was measured. The measured value (diameter) was then converted to an equivalent value using the initial diameter of the silicone gel cured product as 100. The thus obtained equivalent values are shown in Table 1.

TABLE 1

|  | Example | | | Comparative example | | | | | |
| --- | --- | --- | --- | --- | --- | --- | --- | --- | --- |
|  | 1 | 2 | 3 | 1 | 2 | 3 | 4 | 5 | 6 |
| Penetration value for cured product |  |  |  |  |  |  |  |  |  |
| Initial | 70 | 40 | 120 | 65 | — | 10 | 10 | 40 | 60 |
| After 1 week | 100 | 100 | 100 | 100 | — | 100 | 100 | 100 | 100 |
| After 2 weeks | 100 | 100 | 100 | 140 | — | 110 | 110 | 100 | 100 |
| After 4 weeks | 100 | 100 | 100 | 180 | — | 110 | 110 | 120 | 110 |
|  | 100 | 100 | 100 | 220 | — | 110 | 120 | 140 | 120 |

*Comparative example 2: the composition did not cure on dripping

A silicone gel cured product obtained by curing a composition of the present invention retains the low elastic modulus and low stress that represent characteristic features of a silicone gel, while suffering no oil bleeding over time, and is consequently expected to be useful in applications such as the protection of electronic components such as ICs and hybrid ICs.

What is claimed is:

1. A silicone gel composition, comprising:
(A) 100 parts by mass of an organopolysiloxane containing at least one alkenyl group bonded to a silicon atom within each molecule, represented by an average composition formula (1a):

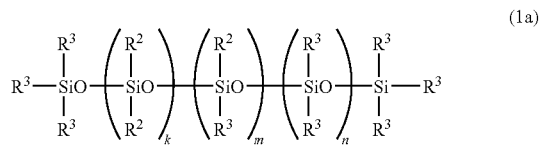

(1a)

wherein,
each $R^2$ group represents, independently, an unsubstituted or substituted monovalent hydrocarbon group that contains no aliphatic unsaturated bonds,
each $R^3$ group represents, independently, either an unsubstituted or substituted monovalent hydrocarbon group that contains no aliphatic unsaturated bonds, or an alkenyl group, and one of the terminal $R^3$ groups at both molecular chain terminals is an alkenyl group,
k represents an integer of 40 to 1,200,
m represents an integer of 0 to 50, and
n represents an integer of 0 to 50;
(B) an organohydrogenpolysiloxane containing at least two hydrogen atoms bonded to silicon atoms and unsubstituted or halogen-substituted monovalent hydrocarbon groups not containing aliphatic unsaturated bonds as substituents bonded to silicon atoms within each molecule;
wherein said organohydrogenpolysiloxane consists of organohydrogenpolysiloxanes comprising from 100 to 1,000 silicon atoms within each molecule, containing at least two hydrogen atoms bonded to silicon atoms at the non-terminal positions and represented by an average unit formula (2):

$$R^4_c H_d SiO_{(4-c-d)/2} \quad (2)$$

wherein,
each $R^4$ group represents, independently, an unsubstituted or halogen-substituted monovalent hydrocarbon group that contains no aliphatic unsaturated bonds,
c represents a positive number ranging from 1.0 to 2.2,
d represents a positive number ranging from 0.002 to 0.025, and
c+d represents a number within a range from 1.001 to 2.225, in a quantity of at least 15 parts by mass, and in sufficient quantity to provide from 0.3 to 2.5 hydrogen atoms bonded to silicon atoms for every one alkenyl group bonded to a silicon atom within said component (A); and
(C) an effective quantity of a platinum-based catalyst.

2. The silicone gel composition according to claim 1, wherein the number of silicon-bonded hydrogen atoms (SiH) within each molecule of component (B) is within the range of 2 to 5.

3. The silicone gel composition according to claim 1, wherein a ¼ cone penetration value of a cured product of said composition, as defined in JIS K2220, is within a range from 20 to 200.

4. The silicone gel composition stated in claim 1, wherein component (B) is blended with component (A) in a quantity of component (B) ranging from 15 to 500 parts by mass per 100 parts by mass of said component (A).

5. A cured product produced by curing the composition as claimed in claim 1, wherein a ¼ cone penetration value of said cured product, as defined in JIS K2220, is within a range from 20 to 200.

6. The cured product as claimed in claim 5, wherein a ¼ cone penetration value of said cured product, as defined in JIS K2220, is within a range from 40 to 160.

7. The cured product as claimed in claim 5, wherein a ¼ cone penetration value of said cured product, as defined in JIS K2220, is within a range from 50 to 140.

8. The silicone gel composition according to claim 1, wherein said component (C) is present in an amount of from 0.1 to 1,000 ppm relative to the combined mass of component (A) and component (B).

9. The silicone gel composition according to claim 1, wherein each $R^2$ group is, independently, a methyl group, a phenyl group, or a 3,3,3-trifluoropropyl group; and each $R^3$ group that is not an alkenyl group is, independently, a methyl group, a phenyl group, or a 3,3,3-trifluoropropyl group.

10. The silicone gel composition according to claim 1, wherein each $R^4$ group is, independently, a methyl group, a phenyl group, or a 3,3,3-trifluoropropyl group.

* * * * *